UNITED STATES PATENT OFFICE.

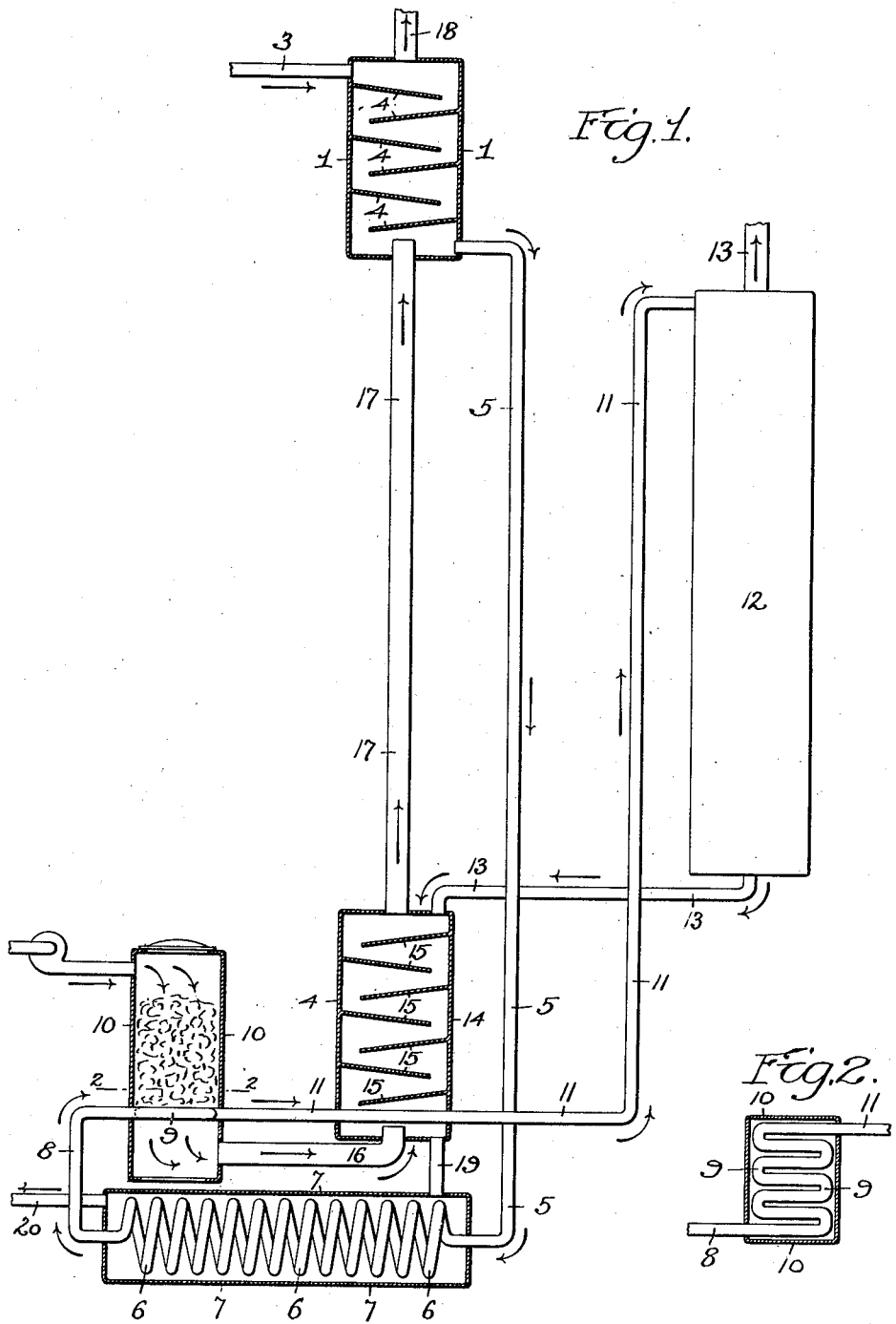

WILLIAM G. TOPLIS, OF PHILADELPHIA, PENNSYLVANIA.

RECOVERING ALCOHOL FROM FERMENTED LIQUIDS AND APPARATUS THEREFOR.

1,364,160.   Specification of Letters Patent.   Patented Jan. 4, 1921.

Application filed July 27, 1917. Serial No. 183,084.

*To all whom it may concern:*

Be it known that I, WILLIAM G. TOPLIS, a citizen of the United States, residing in Philadelphia, Pennsylvania, have invented certain Improvements in Recovering Alcohol from Fermented Liquids and Apparatus Therefor, of which the following is a specification.

My invention consists of certain improvements in method of and apparatus for the extraction of alcohol from fermented liquids, and has as its objects the effective utilization of the heat from a given amount of fuel, the shortening of the time and lessening of the care required in carrying on the process and the recovery of all of the alcohol contained in a given quantity of fermented liquid. The invention also comprises apparatus whereby such procedure may be carried out.

The methods at present in use for manufacturing alcohol from fermented liquids are objectionable in that unless conducted slowly and with extreme care they are wasteful and inefficient. This objection I overcome in the manner hereinafter set forth, reference being had to the accompanying drawing, in which—

Figure 1 is a view partly in side elevation and partly in vertical section of alcohol removal apparatus constructed in accordance with my invention, and Fig. 2 is a transverse section on the line 2—2, Fig. 1.

In carrying out my invention the fermented liquid from which it is desired to extract the alcohol is introduced at the top of the tower 1 by means of a pipe 3 through which it has been conveyed from the fermenters. (Hereinafter, for convenience, I shall refer to this fermented liquid as "beer"). After entering the top of the tower 1 the beer, which is cold, flows downwardly over a series of baffle plates 4 in the tower and is acted upon by certain hot gases traveling upwardly through the tower in a manner to be hereinafter described.

During the downward travel through the tower 1 the beer becomes warm, and the warm beer escapes from the bottom of the tower through a pipe 5, the lower end of which is in communication with a coil 6 contained within a vessel 7 in which it is further heated, as hereinafter set forth.
After leaving the coil 6 the beer passes through a pipe 8 which forms a grate 9 in a furnace 10. The beer leaves the grate 9 at a high temperature owing to the fact that it is heated under hydrostatic pressure due to the height of the pipe 5 which supplies the coil 6 and of the pipe 11 which receives the discharge from the grate 9. Through the pipe 11 the highly heated beer flows to the upper portion of a distillation tower 12, in which it is released from pressure and through which it flows downwardly over baffle plates similar to those of the tower 1. During its downward flow through the distillation tower 12 the greater portion of the alcohol contained in the beer is vaporized by the heat of the beer and escapes upwardly through an outlet pipe 13 which conveys it to a suitable rectifying apparatus.

The temperature of the beer which escapes from the bottom of the distillation tower 12 is below the vaporizing point of the alcohol, and the beer still contains a small percentage of alcohol, which percentage is normally wasted. In my apparatus, however, the beer escaping from the bottom of the distillation tower 12 is conveyed through a pipe 13ª to the top of a tower 14, which is in construction similar to the tower 1. As the cooled beer travels downwardly over baffle plates 15 in the tower 14 it is acted upon by upwardly traveling products of combustion from the furnace 10 through which forced down draft is maintained.

The highly heated products of combustion from the furnace 10 enter the bottom of the tower 14 through a pipe 16 and as they travel upwardly through the tower the beer traveling downwardly therethrough is caused to boil violently and the slight percentage of alcohol still in the beer is vaporized and escapes with the products of combustion from the top of the tower 14 through a pipe 17.

The upper end of the pipe 17 communicates with the bottom of the tower 1, and the products of combustion, together with the alcohol vapor carried thereby, enter the tower 1, flow upwardly therethrough, and are acted upon by the descending stream of cool beer which condenses and absorbs the alcohol vapor and becomes enriched thereby. The waste gases then escape from the tower 1 through a pipe 18 which communicates with a suitable stack.

The boiling waste beer from which the last trace of alcohol has been extracted leaves the tower 14 through a pipe 19 which communicates with the vessel 7. The boiling waste fills this vessel and serves to heat the beer passing through the coil 6, the waste escaping from the boiler 7 through a pipe 20 which communicates with the sewer or with suitable utilization apparatus.

Neither in the liquid waste escaping from the apparatus through the pipe 20 nor in the gaseous waste escaping through the pipe 18 does any alcohol or alcohol vapor remain, all of the alcohol which was in the cold beer when it entered the tower 1 having been removed during the treatment of the beer in accordance with this process.

As the pipe 11, through which the beer passes from the grate 9 to the distillation tower 12, is caused to pass through the bottom of the tower 14 the beer passing through said pipe 11 will be acted upon by the heat of the products of combustion passing through said tower, and the beer will be heated to a higher degree when it enters the distillation tower 12 than if the pipe 11 did not pass through the tower 14.

Ordinarily the beer passing through the tower 1 is heated by contact with live steam, and the water of condensation from the latter dilutes the beer and renders the distillation process less effective.

By subjecting the beer in the tower 1 directly to the action of the products of combustion from the furnace 10, such dilution is prevented and the beer enters the distillation tower 12 not only at full strength but enriched by the alcohol absorbed from said products of combustion.

The process can also be conducted more rapidly than usual, and without the care usually required, hence the percentage of alcohol produced during a given time is also increased, as compared with the usual methods.

The temperature of the liquid in the pipes 5 and 13 and in the vessel 7 should be below the vaporizing point.

I claim:

1. The within described improvement in the process of extracting alcohol from fermented liquid, said improvement consisting in subjecting to a secondary distillation the waste liquid from a primary distillation apparatus and then adding the alcohol from said secondary distillation to the initial supply of fermented liquid before the latter enters the primary distillation apparatus.

2. The within described improvement in the process of extracting alcohol from fermented liquid, said improvement consisting in subjecting to a secondary distillation the waste liquid from a primary distillation apparatus, and in then causing the alcohol vapor from said secondary distillation to be condensed and absorbed by the initial supply of fermented liquid before the latter enters the primary distillation apparatus.

3. The within described improvement in the process of extracting alcohol from fermented liquid, said improvement consisting in first subjecting the waste liquid from the primary distillation apparatus to the action of a heated gas which vaporizes the alcohol contained in said waste liquid, and in then subjecting said heated gas and alcohol vapor to the action of the initial supply of fermented liquid before the latter reaches the primary distillation apparatus.

4. In an apparatus for recovery of alcohol from fermented liquid, the combination of a distilling apparatus, primary and secondary heating towers, means for supplying fermented liquid to said primary tower, means for conveying said liquid to said distilling apparatus, means for conveying the waste liquid from said distilling apparatus to said secondary heating tower wherein such alcohol as remains in said waste liquid is removed, and means for conveying such removed alcohol from said secondary heating tower to said primary heating tower wherein said alcohol is added to the initial supply of fermented liquid.

5. In an apparatus for recovery of alcohol from fermented liquid, the combination of a distilling apparatus, primary and secondary heating towers, means for supplying fermented liquid to said primary tower, means for conveying said liquid to said distilling apparatus, means for conveying the waste liquid from said distilling apparatus to said secondary heating tower wherein such alcohol as remains in said waste liquid is removed, a furnace, means for conveying products of combustion from said furnace to said secondary heating tower, and means for conveying said products of combustion and the alcohol vapor therein contained, to the primary heating tower.

6. In an apparatus for recovery of alcohol from fermented liquid, the combination of a heating tower for said liquid, a furnace for supplying products of combustion to said tower, a vessel for receiving the waste liquid from said tower, and a liquid conveying pipe passing through said vessel and then through the furnace.

7. In an apparatus for recovery of alcohol from fermented liquid, the combination of a heating tower for said liquid, a furnace for supplying products of combustion to said tower, a vessel for receiving the waste liquid from said tower, and a liquid conveying pipe passing through said vessel, then through said furnace and then through the tower.

8. In an apparatus for the recovery of alcohol from fermented liquid, the combination of primary and secondary heating towers, a furnace for heating the same, a distillation tower, means for conveying the waste therefrom to said secondary heating tower, a vessel for receiving the waste from said secondary heating tower, and a liquid conveying pipe passing through said vessel, said pipe receiving its supply from said primary heating tower and serving to supply the fermented liquid to the distillation tower.

9. In an apparatus for the recovery of alcohol from fermented liquid, the combination of primary and secondary heating towers, a furnace for heating the same, a distillation tower, means for conveying the waste therefrom to said secondary heating tower, a vessel for receiving the waste from said secondary heating tower, and a liquid conveying pipe passing through said vessel, then through the furnace, said pipe receiving its supply from said primary heating tower and serving to supply the fermented liquid to the distillation tower.

10. In an apparatus for the recovery of alcohol from fermented liquid, the combination of primary and secondary heating towers, a furnace for heating the same, a distillation tower, means for conveying the waste therefrom to said secondary heating tower, a vessel for receiving the waste from said secondary heating tower, and a liquid conveying pipe passing through said vessel, then through the furnace, and then through the secondary heating tower, said pipe receiving its supply from said primary heating tower and serving to supply the fermented liquid to the distillation tower.

In testimony whereof I have signed my name to this specification.

WILLIAM G. TOPLIS.